June 4, 1957     E. GRETENER     2,794,739
METHOD FOR PRODUCTION OF LENTICULATED FILM
Filed Feb. 23, 1950     2 Sheets-Sheet 1
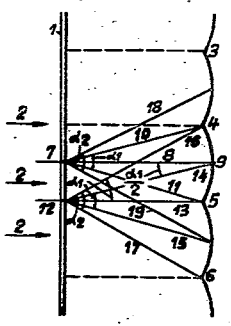
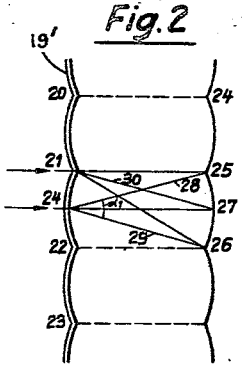
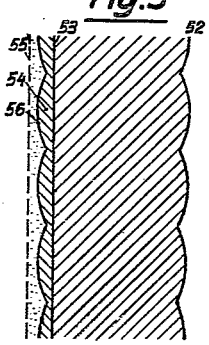
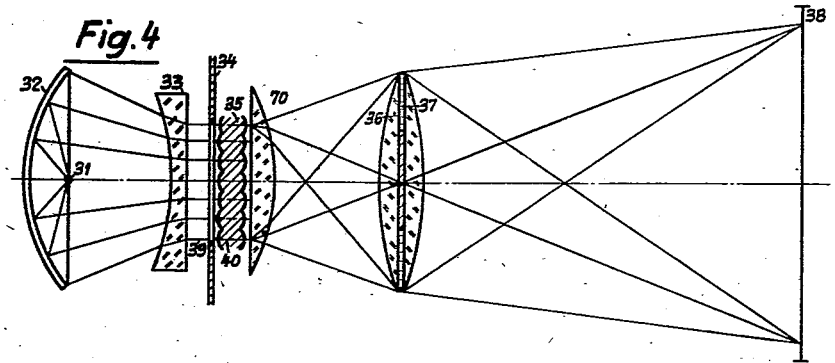
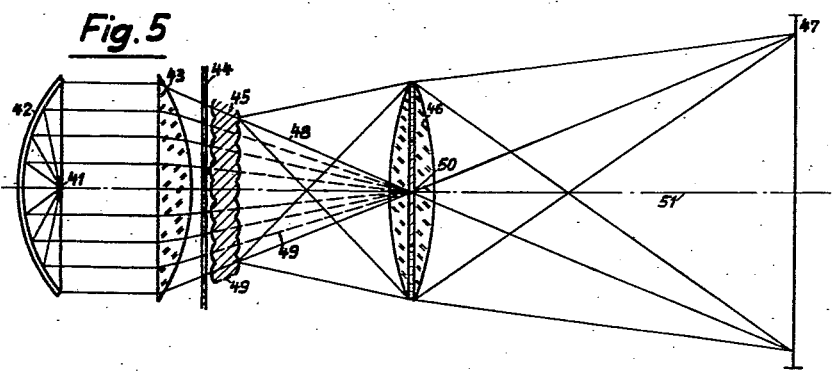
Edgar Gretener
INVENTOR.
BY
Pierce, Scheffler & Parker
ATTORNEYS June 4, 1957 E. GRETENER 2,794,739
METHOD FOR PRODUCTION OF LENTICULATED FILM
Filed Feb. 23, 1950 2 Sheets-Sheet 2
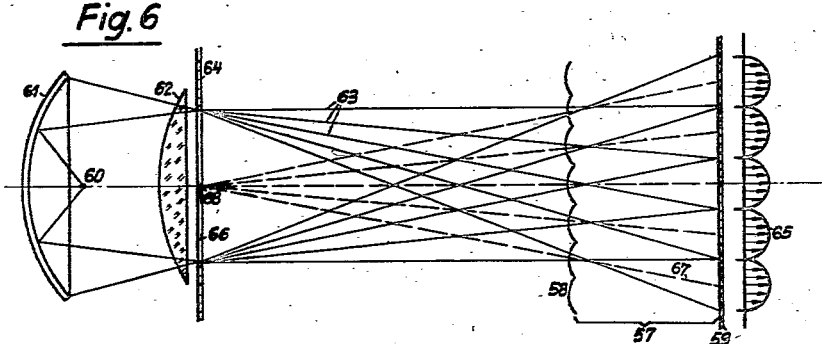
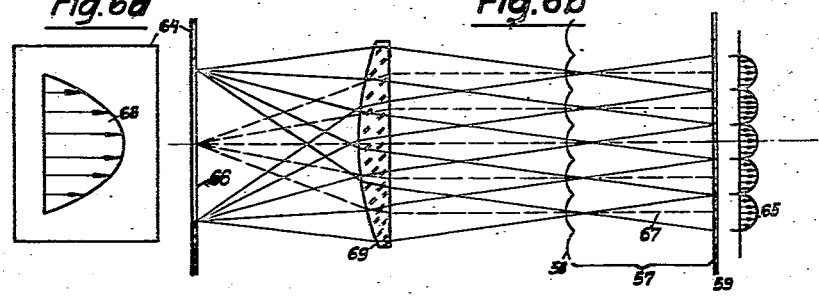
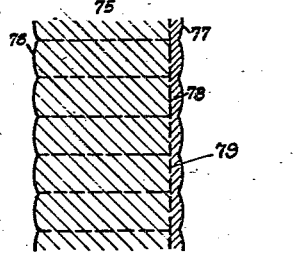
Edgar Gretener
INVENTOR.
BY
Pierce, Scheffler & Parker
ATTORNEYS

United States Patent Office 2,794,739
Patented June 4, 1957

2,794,739

METHOD FOR PRODUCTION OF LENTICULATED FILM

Edgar Gretener, Zurich, Switzerland, assignor to Ciba Products Corporation, Kimberton, Pa.

Application February 23, 1950, Serial No. 145,661

Claims priority, application Switzerland February 23, 1949

11 Claims. (Cl. 96—26)

This invention relates to lenticulated film for the projection of pictures, more particularly to lenticulated film for the projection of colored pictures according to the additive method and to a process for its production.

Systems well known in the prior art for the projection of colored motion pictures according to the additive method employing one sided lenticular film have not proven satisfactory. They have not been capable of fully exploiting the high quality of color reproduction offered in principle by the method of additive color mixture, as the necessary brightness of the projected pictures on large screens could not be obtained. This failure is partly due to the fact that one part of the light flux passing through one sided lenticular film is deviated from the proper light path and cannot be utilized for projection. This loss of light may run up to 50% of the total light flux and not only means a considerable diminution of the efficiency of illumination but at the same time restricts the obtainable maximum value of screen brightness as the aperture of projection objectives is limited.

The employment of film with two lenticulated surfaces theoretically would remedy such losses and offer a satisfactory solution of this problem; a satisfactory practical application of such doubly lenticulated film, however, depends upon the precision with which both lenticular grids can be produced. Since the known methods of manufacture do not permit the production of the lenses in the opposite faces of the film, with the precision required, the use of doubly lenticulated film in a picture projection system has not been accomplished in practical application.

Furthermore even if both lenticular grids could be produced with the required precision such doubly lenticulated film would be useless for practical employment as long as for the purpose of photographic recording the customary silver bromide emulsion is cast onto the film. The emulsion will partly fill the recesses formed by adjoining lenses of said grid and will form a plane or approximately plane surface interfering with the optical effects of the lenticulations on that particular side of the film.

The invention has the object to overcome said difficulties by eliminating the defects inherent in known forms of lenticular film and to enhance the projection of motion pictures employing such film as to the quality of reproduction and brightness.

Another object of the invention is to improve the quality of projected pictures as the invention excludes all interference of the picture recording layer on said film with the optical effects of the lenticulations.

It is another object of the invention to provide methods for the manufacture of such lenticular film which will result in lenticulations of required precision as to form and mutual position.

The invention also has the object of permitting the employment of projection systems of various optical properties as the invention permits the manufacture of lenticulated film appropriately adapted to any optical configuration of the projection system.

Other objects and advantages of my invention will become more apparent from a study of the following specification when considered in conjunction with the accompanying drawings.

As the main field of application of doubly lenticulated film according to this invention is the projection of colored motion pictures, reference will be made in the following to this kind of application. Lenticular film, however, may advantageously be employed also for the projection of stereoscopic motion pictures and by replacing the customarily cylindrical lenses of the lenticular grids by spherical ones even the projection of colored stereoscopic motion pictures is possible.

In the accompanying drawings.

Fig. 1 represents a cross-section through one sided lenticulated film,

Fig. 2 represents a cross section through double lenticulated film,

Fig. 3 represents a cross section through a piece of film according to this invention one lenticular grid of which has been produced by a photochemical process, Fig. 4 schematically represents a projection system for such doubly lenticulated film according to the invention, Fig. 5 schematically represents a projection system of a modified type for lenticulated film, Figs. 6, 6a and 6b schematically represent a method for photochemically producing the second lenticular grid of film according to the invention, Fig. 7 represents a cross section through a piece of film as set forth by this invention which is sensitized by impregnation with a light sensitive substance.

In all drawings the lenses of lenticulated film are of cylindrical shape lying at right angles to the plane of the sectional plane of the drawing.

Fig. 1 is to explain the reasons for the failure of one sided lenticulated film to obtain projection of colored motion pictures with sufficient brightness. It represents a cross section through a piece of one sided lenticular film. The picture recording is situated on the smooth side 1 of the film and the illumination is effected from this side as indicated by arrows 2. A light beam entering the film from the side of the picture recording at a point, e. g. 7, situated opposite to the summit 9 of lens 4—5 must have an angle of aperture $\alpha_1$ if the face of lens 4—5 is to be fully illuminated. The axis of said beam is at right angles to the smooth surface 1 of the film. Its central ray 8 undergoes no deviation and pierces the refractory surface of lens 4—5 at its summit 9. The laterally divergent rays 10 and 11 of said beam, each including half of the desired aperture angle $\alpha_1$ with said central ray, pierce the lens face at points 4 and 5 respectively and thus fully illuminate the lens face.

A light beam with an angle of aperture $\alpha_1$ entering the film at point 12 opposite to the edge formed by lenses 4—5 and 5—6 composed of rays 13—14—15 will illuminate however only part of the face of lens 4—5 and part of lens 5—6. This latter part of the light will be deviated by lens 5—6 in such a way, that it does not reach the projection objective.

In order to ensure total illumination of the lens face also from point 12 a light beam with laterally divergent rays 16 and 17 must have an aperture of the double value $\alpha_2$. The part of the light flux unintentionally illuminating the adjacent lenses may run up to half of the total light flux and is lost as it does not reach the projection objective.

Such waste of light may be avoided by the employment of doubly lenticulated film according to Fig. 2. The surface 19 carries the picture recording and the lenticulations 20—21, 21—22 and 22—23. A light beam entering at a point 24 on the summit of lens 21—22 fully illuminates the face of the conjugate lens 25—26 on the opposite surface of the film if the envelope rays of said beam include an angle of aperture $\alpha_1$. A similar light beam entering at a point 21 which before entering is parallel to the aforementioned beam is deflected by lens 21—22 in such a way that the central ray 30 of such beam now pierces the summit 27 of lens 25—26. The laterally divergent rays of said beam similarly include an angle of aperture $\alpha_1$ and consequently this beam is sufficient to illuminate the full face of lens 25—26.

To obtain this combined effect of both lenticular grids, it is necessary that the conjugate lenses exactly hold mutually corresponding positions to each other. For waste of light or loss of any element of the picture recording can only be avoided if every element of the picture recording is fully illuminated and utilized by the pertaining lenses of the lenticular grids of the film. This naturally sets up rigid requirements as to the mutual position and form of the individual lenses.

Up to now production of such doubly lenticulated film proved technically impossible. By the employment of the conventional mechanical goffering methods the required exact mutual positioning of the conjugate lenses on both sides of the film practically cannot be obtained, especially not if according to Fig. 5 the lenses of the second lenticular grids must be displaced in respect to the conjugate lenses of the first grid, as they approach the margin of the frame, in relation to their distance from the optical axis of the system.

Only by a process of manufacture according to this invention is it possible without difficulty to obtain an exact mutual positioning of the lenticulations on both sides appropriately adapted to any projection system.

Said process of manufacture employs a first lenticular grid already existing on the film to be provided with the second lenticular grid. As said first lenticular grid need not meet similar requirements in respect to its position on the film, it may be produced by a mechanical process, which has the advantage of being cheaper and less complicated than a phototechnical one. The second lenticular grid then is produced photochemically from said first grid by exposure of a layer on said film, especially a sensitized gelatine layer that is hardenable by light. The exposure is chosen in such a way that after washing out the unhardened parts of said layer and after drying it the second lenticular grid appears on the film as a gelatine relief of desired form.

A layer of gelatine is cast onto the smooth side of a film with one side already lenticulated e. g. by a mechanical process. Said layer is sensitized e. g. with bichromate of potassium and subsequently is exposed according to this invention by projecting images of an appropriately shaped light emitting surface of homogeneous luminosity onto said light sensitive gelatine layer through the lenses of the first lenticular grid. Thereby the exact mutual position and form of the lenticulation of the second grid in respect to the first one is insured. As the exposed and the unexposed parts of the light sensitive layer show a differing solubility, washing out of the developed gelatine will leave on the film a gelatine relief corresponding in its thickness to the varying intensity of exposure in different points along the film surface. This relief is then dried and may, if necessary, be hardened to withstand the wear of normal use, e. g. with formaline or chrome alum.

Fig. 3 represents a cross section through a piece of doubly lenticulated film obtained by a method of manufacture according to this invention. 52 is the previously lenticulated first surface, 53 the originally smooth surface of the film with the gelatine layer 54 cast thereon. The original smooth surface of said layer before exposure and development is indicated by dotted lines 55. After exposing, washing out and hardening, if necessary, a relief 56 of gelatine is left in the desired form. The lenses of this relief have positions rigidly fixed opposite the lenses of the lenticulated surface 52.

The mutual position of the conjugate lenses on both surfaces of the film must naturally be adapted to the construction of the projection system employed. This is shown in Figs. 4 and 5.

Fig. 4 schematically represents a conventional projection system comprising the light source 31, preferably the positive crater of an electric arc, with a concave mirror 32 and field lenses 33 and 70 as means of light condensation. 34 is the film gate, 35 a piece of doubly lenticulated film, 36 the projection objective embodying the color filter 37 and 38 the screen. By the employment of field lenses 33 and 70 the illumination beams show main rays 39 passing through the film parallel to each other. Consequently the images of the light source 31 or of the color filter 37 seen from the film lie at infinity. This special kind of optical arrangement is therefore spoken of as "telecentric" at the film. To ensure exact cooperation of the picture recording, projection objective and of the lenticulations on both sides of the film, it is necessary that the "central" planes connecting the centres of curvature of conjugate lenses are parallel to each other, as indicated by dotted lines 40.

Fig. 5 schematically represents another projection system for doubly lenticulated film according to this invention. The projection system differs insofar from that shown in Fig. 4 as the main rays 48 of the beam are not parallel to each other at the film 45, but intersect in one common point on the optical axis 51 of the projection system. Similarly to the preceding drawing in Fig. 4, 41 represents the light source, 42 a concave mirror, 43 the condenser lens, 44 the film gate, 46 the projection objective comprising the color filter and 47 the screen. Here the central planes of the conjugate lenses indicated by dotted lines 49 intersect in a line at right angles to the plane of the drawing and which pierces the above mentioned point 50 on the optical axis. Consequently the "central" planes of the individual lenticulations no longer are perpendicular to the plane of the film, but are more and more tilted against the optical axis of the projection system as the lenticulations approach the margin of the picture frame.

Figs. 6, 6a and 6b schematically represent an optical arrangement for the manufacture of the second lenticular grid departing from a first grid already existing on the film. The lenses of the first lenticular grid are employed as objectives imaging an appropriately shaped light emitting surface onto the light sensitive gelatine layer on said film in order to obtain the second lenticular grid in the desired form. 57 represents the film with previously applied lenticular grid 58 and the light sensitive gelatine layer 59. The exposure is effected by a light source 60, a concave mirror 61 and a condenser lens 62, casting light rays 63 onto the film 57. The opening 66 of the diaphragm 64 inserted into the light path behind the condenser lens 62 serves as light emitting surface with homogeneous light intensity and is imaged by the elementary lenses of grid onto the gelatine layer 59. By suitably forming the opening 66 of diaphragm 64 the intensity of exposing light in said layer will be distributed according to the desired form of lenticulations of the second grid. The distribution of light 65, indicated by arrows, is proportionate to the form of opening 66 of diaphragm 64. The mutual position of the lenses of the second grid is determined by distance of the diaphragm from the film. In the embodiment shown in Fig. 6 the mutual position of conjugate lenses of both grids is chosen to meet the requirements of a projection system as shown in Fig. 5 of the drawing. The central planes of conjugate lenses intersect in one common line through point 68 on the optical axis of the system.

If a projection system as schematically shown in Fig. 4 is invisaged with a "telecentric" light beam at the film, the required mutual position and form of conjunctive lenses may be obtained by the same process and a similar optical arrangement shown in Fig. 6b. It is only necessary to interpose a field lens 69 into the light path. This field lens will form a "telecentric" beam at the film for exposure of the gelatine layer. Consequently the central planes of conjugate lenses will be parallel to each other and at right angles to the film.

Spherical lenticulations are manufactured in the same way employing now an equally spherical first lenticular grid. In order to obtain the desired distribution of exposing light in the light sensitive gelatine layer the appropriately shaped light emitting surface which is imaged onto said gelatine layer by the lenses of the first lenticular grid, no longer must show a homogeneous but a continuously graduated distribution of light intensity. The positioning of the second lenticular grid to the chosen projection system is obtained as above described. Now analogously to the central planes of the cylindrical lenses the axes of the spherical lenses connecting the centres of curvature are either parallel or intersect in one common point.

Doubly lenticulated film manufactured according to the invention as above described however does not yet contain a light sensitive layer permitting registration of the picture to be projected. For a satisfactory projection it is imperative that the precision of the lenticulations is not impaired by the picture recording layer. The light sensitive gelatine emulsions generally employed for this purpose will cause interference, as the optically active surface will not be formed by the surface of the film but by the surface of the gelatine emulsion after such gelatine emulsion is cast onto said surface. Due to its viscosity the normally employed light sensitive emulsion will accumulate in the recesses formed by the edges of adjoining lenticulations and considerably impair if not destroy their effect.

This difficulty may be overcome by directly sensitizing one side of the film by impregnating it with light sensitive substances. Preferably that same gelatine layer is sensitized that served for the manufacture of the second lenticular grid. Such methods have become known and are e. g. described in the German Patent No. 640,233 (Kalle) which employs a suitable diazonium compound with silver nitrate as sensitizing substance and an organic acid. By impregnating the gelatine of the second lenticular grid with a such light sensitive solution a light sensitive layer of high resolving power is obtained. The material of the film and of the photochemically produced grid are appropriately chosen in such a way, that said solution is rejected by the film and exclusively the gelatine of the lenticular grid is impregnated. The sensitizing solution only penetrates as far as the separating surface 53 in Fig. 3 between the film and the gelatine and consequently the sensitization is kept limited to the gelatine layer 54. The photochemical registration is only effected in this plane layer.

Fig. 7 shows a cross section through a piece of doubly lenticulated film 75 sensitized in the above mentioned way. 76 and 77 are the two lenticular grids, where the grid 77 is produced by a photochemical process leaving a gelatine relief 78 on the film. Only this relief 78 will absorb the light sensitive substances. As the absorption of such substances does in no way deform the lenses of grid 77 this method of sensitization is without any harmful effects on the optical properties of the lenticulations and the photochemical recording is situated in the separating plane 79.

The exposure of a doubly lenticulated film sensitized for recording purposes, especially the printing of projection copies is preferably effected by employing an optical printing process well known in the art of lenticulated film. The development after exposure of the latent picture is preferably executed by applying "physical" methods.

Other sensitizing methods, obtaining similarly satisfying results, have been described in "Philips Technische Rundschau," Ser. 9, Nos. 3 and 10, pp. 65 to 96 and 289 to 320. This process employs mercuro-diazonium-salts and equally allows picture recording with high resolution power.

By altering certain conditions, e. g. the humidity of the sensitized film or the intensity of exposing light, the form of the density curve for attaining of appropriate gamma-values may be influenced according to the requirements of the intended picture recording. The development of a film sensitized by mercuro-diazonium-salts and exposed in an optical printing process may also be executed employing "physical" methods.

The following examples will show known methods of sensitizing employable for doubly lenticulated film without however limiting the invention thereto. In this example parts are indicated in parts by weight.

EXAMPLE 1

*Sensitizing the doubly lenticulated film for picture recording*

In analogy to Example 2 of German Patent No. 639,394a sensitizing solution is prepared from 0.2 part of 4-diethylaminobenzene-1-diazonium-fluoroboride, 0.3 part of tartaric acid, 0.45 part of silver nitrate, and 15 parts of distilled water.

The gelatine layer of the photochemically produced lenticular grid is impregnated with the above sensitizing solution and the film then dried to the desired degree of dryness.

EXAMPLE 2

*Copying and developing the film*

The film obtained according to Example 1 is exposed in a suitable copying apparatus. It is then treated with steam and a very weak image is obtained. This image is then developed until the desired contrasts appear, using a solution of 40 parts of hydroquinone, 10 parts of citric acid and 1000 parts of distilled water, to which there are added shortly before use 333 parts of a 3.3% silver nitrate solution. Depending on the effect desired, similar sensitizing solutions or other developing solutions may be used, as, for example, those described by Eder in "Rezepte, Tabellen and Arbeitsvorschriften für Photokopie und Reproduktionstechnik," page 80 (1927). In this manner a copy with the desired image registration is obtained.

EXAMPLE 3

*(a) Preparation of gelatine for coating*

0.3 part of pure thymol is dissolved in 630 parts of distilled water by heating to 50–60° C., then allowed to cool whereupon there are added to the solution 70 parts of gelatine "Schering-Kahlbaum Ia" brand. The gelatine is allowed to swell for one hour and the mixture then liquefied by heating to 40–41° C. At this temperature a solution of 0.75 part of crystallized potassium aluminum sulfate [$KAl(SO_4)_2.12H_2O$] in 40 parts of distilled water and 4 parts by volume of pure glycerine is run in in the course of 5 minutes, while stirring. The mixture is stirred for another 15 minutes at 40–41° C. and then clarified by filtration.

*(b) Casting and sensitizing the gelatine layer*

Onto one-sided lenticular nitro cellulose film of 0.135 mm. thickness which has previously been coated on the smooth side with a solution of 0.5 part of gelatine (see above), 5 parts of glacial acetic acid, 80 parts by volume of ethyl alcohol and 15 parts by volume of methyl alcohol, there is poured the gelatine mass obtained according to (a) above, and heated to 30–33° C. The spreading of the gelatine mass is so regulated as to obtain an air-dried gelatine coating of 0.010 to 0.012 mm. When the gelatine has solidified, the film is dried for 24 hours in an open space and then dipped for 30 seconds into a solution consisting of 1000 parts of distilled water, 30 parts of potassium bichromate, 0.2 part of ammonium carbonate and 2 parts of a wetting agent of the sodium isopropylnaphthalene sulphonate type. The uncoated side of the film which has been sensitized in this manner on the coated side is repeatedly wiped while still wet with a piece of deerskin leather soaked with distilled water, and then dried in a dust-free current of air of 25–28° C.

(c) *Exposure*

The sensitized and dried film obtained according to (b) above is exposed as shown in Fig. 6 or 6b for about 6 minutes to the light of e. g. a mercury lamp of the type Philips Philora HPW 125 watt, 57202 E/70.

The shape of the opening of diaphragm 64 may be exactly determined by calculation. The limit value of exposure sufficient to harden the gelatine is known. To attain this limit value inside the gelatine layer at a depth equal to the prescribed thickness of the lenticular lens in a particular point, the required intensity of exposing light incident on the separating surface between the nitrocellulose film and the gelatine layer and pertaining to that point, is obtained by multiplying said limit value of exposure with the coefficient of light absorption encountered by light penetrating into said gelatine layer to said depth.

Instead of the mercury lamp a strong arc light with a suitable interposed filter may be used. In such case, the exposure time can be reduced to as little as 1/20 of a second. If desired, other light sources may be employed, but the fact should be taken into account that the gelatine sensitized according to this example is practically only sensitive to ultraviolet light. Owing to this limited sensitivity, the film presents the advantage that its entire treatment can be carried out in visible light, e. g. that of a sodium lamp.

(d) *Development of the lenticulations*

The film exposed according to (c) is agitated for 5 to 10 minutes in distilled water of 40–42° C. In this operation the gelatine parts which are not light-tanned dissolve, forming the lenticular grid. The film is then dried in the usual manner.

In this way, a clear lenticulation of excellent uniformity and a smooth unscratched surface is obtained. To increase the mechanical strength, it is advisable to subject the film to an after-treatment with known tanning agents, such as formaldehyde or chrome alum.

EXAMPLE 4

10 parts of granulated emulsion gelatine, the 10% jelly of which has a melting range of 31–33° C. are dissolved in 90 parts of distilled water containing 0.045 part of thymol in solution, by allowing them to swell and then heating to 40–41° C. A nitrocellulose film of 0.135 mm. thickness, one side of which has a mechanically produced cylindrical lenticulation of 38 lenses per mm. is first given a substratum on the smooth side as indicated in Example 1(b) and then coated with the aforedescribed 10% gelatine solution at a coating temperature of 30–33° C. to form a coating of 0.010 to 0.013 mm. (when dry). The film is dried by treating it, with the solidified gelatine, in a current of air of 60–65° C. for 15 minutes. The film is then sensitized and dried as shown in Example 1(b), and exposed for about 2 seconds in an apparatus according to Figure 6 or 6b. The development according to Example 1(d) is then carried out in running water of 44–45° C. to obtain a film with lenticulation on both sides, an element on one side always being optically coordinated with an element on the other side.

In lieu of a film with a mechanically made first grid, analogous use may be made in this example of a film with a photochemically prepared first lenticular grid.

Especially it is to be understood, that whereas reference has been made to the employment of this invention for the purposes of the projection of colored motion pictures it is by no means limited to that field of technique as with slight alterations of the form of lenticulations even the projection of stereoscopic colored motion pictures is possible.

I claim:

1. A process for the manufacture of doubly lenticulated film which comprises the steps of forming a film with one lenticulated side and one smooth side, applying to the smooth side of the film a layer comprising an organic colloid containing a light-sensitive substance which will harden the colloid on exposure to light, exposing said applied layer to a light-source located at the lenticulated side of the film in position to form at said applied layer images of the light emitting surface of said light-source as a plurality of adjacent illuminated zones equal in number to and produced by the respective lenses of the lenticulated side of the film, whereby the exposure of said applied layer is graded in accordance with the configuration of the lenticulations, processing the so-exposed layer to remove the unexposed portions of the organic colloid to produce a doubly-lenticulated film in which the hardened colloid forms a lenticular relief corresponding to the originally lenticulated side of the film, and impregnating the doubly-lenticulated film with a light-sensitizing substance.

2. A process for the manufacture of doubly lenticulated film according to claim 1, where said first lenticular grid is produced by a mechanical goffering process.

3. A process for the manufacture of doubly lenticulated film according to claim 1, where said light sensitive layer consists of gelatine sensitized by chromate and cast onto said smooth side of said film, whereby after exposing, washing out and drying said gelatine layer said second lenticular grid is obtained as a gelatine relief.

4. A process for the manufacture of doubly lenticulated film according to claim 1, where said first lenticular grid consists of cylindrical lenses, and where said light source has an emitting surface of homogeneous luminosity, and where said surface is of such a shape that by the resulting distribution of exposing light in said layer cylindrical lenses of desired form are obtained forming said second lenticular grid.

5. A process for the manufacture of doubly lenticulated film according to claim 1, where said first lenticular grid consists of spherical lenses, and where said light emitting surface is of a continuously graduated luminosity, and where said luminosity is graduated in such a way that by the resulting distribution of exposing light in said layer spherical lenses of desired form are obtained forming said second lenticular grid.

6. A process for the manufacture of doubly lenticulated film according to claim 1, where said first lenticular grid consists of cylindrical lenses, and where the images of said light emitting surface are projected in such a way that the central plane of conjugate cylindrical lenses of said two lenticular grids are parallel and at right angles to the plane of said film.

7. A process for the manufacture of doubly lenticulated film according to claim 1, where said first lenticular grid consists of cylindrical lenses, and where the images of said light emitting surface are projected in such a way that with the film flat the central planes of conjugate cylindrical lenses of said two lenticular grids all over any film frame intersect in one common line.

8. A process for the manufacture of doubly lenticulated film according to claim 1, where said first lenticular grid consists of spherical lenses, and where the images of said light emitting surface are projected in such a way that the axes of conjugate spherical lenses of said two lenticular grids are parallel and at right angles to the plane of said film.

9. A process for the manufacture of doubly lenticulated film according to claim 1, where said first lenticular grid consists of spherical lenses, and where the images of said light emitting surface are projected in such a way that the axes of conjugate spherical lenses of said two lenticular grids all over any film frame intersect in one common point.

10. A process for the manufacture of doubly lenticulated film according to claim 1, in combination with the step, after development of said lenticulated relief, of sensitizing one side only of said doubly lenticulated film for subsequent picture recording.

11. A process for the manufacture of doubly lenticulated film according to claim 10, where the layer of the phototechnically produced second lenticular grid is impregnated after the development thereof and for the purpose of picture recording with a light sensitive substance.

References Cited in the file of this patent

UNITED STATES PATENTS

| | | |
|---|---|---|
| 1,722,368 | Comstock | July 30, 1929 |
| 1,849,036 | Ernst | Mar. 8, 1932 |
| 1,918,705 | Ives | July 18, 1933 |
| 1,984,471 | Fischer | Dec. 18, 1934 |
| 2,051,586 | Van Der Grinten | Aug. 18, 1936 |
| 2,203,651 | Capstaff | June 4, 1940 |
| 2,338,654 | Macneille | Jan. 4, 1944 |